(12) United States Patent
Hameau

(10) Patent No.: US 12,007,100 B2
(45) Date of Patent: Jun. 11, 2024

(54) ILLUMINATION DEVICE

(71) Applicant: SIGNIFY HOLDING B.V., Eindhoven (NL)

(72) Inventor: Romain Hameau, Eindhoven (NL)

(73) Assignee: SIGNIFY HOLDING, B.V., Eindhoven (NL)

( * ) Notice: Subject to any disclaimer, the term of this patent is extended or adjusted under 35 U.S.C. 154(b) by 0 days.

(21) Appl. No.: 17/918,814

(22) PCT Filed: Apr. 9, 2021

(86) PCT No.: PCT/EP2021/059327
§ 371 (c)(1),
(2) Date: Oct. 13, 2022

(87) PCT Pub. No.: WO2021/209343
PCT Pub. Date: Oct. 21, 2021

(65) Prior Publication Data
US 2023/0143772 A1 May 11, 2023

(30) Foreign Application Priority Data

Apr. 14, 2020 (EP) ..................................... 20169405

(51) Int. Cl.
*F21V 19/00* (2006.01)
*F21V 5/00* (2018.01)
(Continued)

(52) U.S. Cl.
CPC ............ *F21V 19/003* (2013.01); *F21V 5/007* (2013.01); *F21V 17/12* (2013.01); *F21V 17/164* (2013.01);
(Continued)

(58) Field of Classification Search
CPC ....................................................... F21V 17/12
See application file for complete search history.

(56) References Cited

U.S. PATENT DOCUMENTS 5,434,944 A * 7/1995 Kerry ................... G02B 6/4453
385/136
7,182,627 B1 * 2/2007 Huang ................ F21V 19/0035
362/800
(Continued)

FOREIGN PATENT DOCUMENTS

CN 101688652 B 5/2012
CN 102878456 A 1/2013
(Continued)

*Primary Examiner* — Eric T Eide

(57) ABSTRACT

An illumination device comprising an optical plate extending over a plurality of LEDs arranged on a PCB main surface of a PCB. In a mounted configuration said PCB and optical plate are mutually connected by fasteners. Each fastener extends with play in a plane parallel to said PCB main surface through a through hole in the optical plate in a direction transverse to said PCB main surface. The through hole has a wide portion extending over a depth D from a first main surface of the optical plate facing away from the PCB towards a second main surface of the optical plate facing towards the PCB, and said through hole is narrowed to a neck portion at said depth D. Furthermore, each fastener rests on a resilient washer seated in the wide portion of said through hole.

16 Claims, 5 Drawing Sheets

(51) Int. Cl.
*F21V 17/12* (2006.01)
*F21V 17/16* (2006.01)
*F21Y 105/10* (2016.01)
*F21Y 115/10* (2016.01)

(52) U.S. Cl.
CPC ....... *F21Y 2105/10* (2016.08); *F21Y 2115/10* (2016.08)

(56) References Cited

U.S. PATENT DOCUMENTS

| | | |
|---|---|---|
| 8,529,085 B2 | 9/2013 | Josefowicz et al. |
| 8,651,693 B2 | 2/2014 | Josefowicz et al. |
| 10,746,392 B1* | 8/2020 | Wu ..................... F21V 23/002 |
| 11,143,368 B2* | 10/2021 | Scarlata ................. F21V 23/02 |
| 2012/0087118 A1* | 4/2012 | Bailey .................. F21V 15/015 362/373 |
| 2013/0134115 A1* | 5/2013 | Hernandez-Ariguznaga ............... G02B 6/44528 211/26 |
| 2014/0313733 A1 | 10/2014 | Takeuchi et al. |
| 2015/0241004 A1* | 8/2015 | Oberschmid ........... F21V 13/14 362/235 |
| 2016/0195770 A1* | 7/2016 | Fukai ................. G02F 1/133606 362/311.01 |
| 2018/0066815 A1* | 3/2018 | Chen .................... F21V 17/164 |

FOREIGN PATENT DOCUMENTS

| | | |
|---|---|---|
| CN | 203454007 U | 2/2014 |
| CN | 204611508 U | 9/2015 |
| DE | 102011052583 A1 | 2/2013 |
| EP | 2120248 A1 | 11/2009 |
| GB | 2254668 A | 10/1992 |
| JP | 2006331817 A | 12/2006 |
| KR | 101339198 B1 | 1/2014 |
| WO | 1991017934 A1 | 11/1991 |
| WO | 2008137618 A1 | 11/2008 |
| WO | 2011142891 A1 | 11/2011 |
| WO | 2012142239 A1 | 10/2012 |

* cited by examiner

ILLUMINATION DEVICE

CROSS-REFERENCE TO PRIOR APPLICATIONS

This application is the U.S. National Phase application under 35 U.S.C. § 371 of International Application No. PCT/EP2021/059327, filed on Apr. 9, 2021, which claims the benefit of European Patent Application No. 20169405.6, filed on Apr. 14, 2020. These applications are hereby incorporated by reference herein.

BACKGROUND OF THE INVENTION

LED engines are illumination devices that typically comprise a printed circuit board (PCB) with LEDs arranged, for example mounted, thereon. To collimate and to control the light issued by the LEDs, the PCB with LEDs usually is provided with a monolithic, light transmissive optical plate, for example an optical plate comprising lenses. Typically, in known LED engines the lenses are mounted by means of fasteners in a fixed, aligned position with respect to the LEDs to optimally control the beam shape and beam direction of the light as issued by the LEDs. The material of the PCB often comprises aluminum, such as is typically used in metal core PCB (MCPCB), while the material of the optical plate usually is polymethylmethacrylate (PMMA) or polycarbonate (PC). However, the linear coefficient of thermal expansion of aluminum at 20° C. is about $23*10^{-6}$ $K^{-1}$ differs significantly from the linear coefficient of thermal expansion of PC and PMMA, respectively being about $70*10^{-6}$ $K^{-1}$ and $77*10^{-6}$ $K^{-1}$. Especially, during the light up (hence warming up) of the LED engine this difference in thermal coefficient of thermal expansion could result in misalignment of the LEDs and lenses of the optical plate. The misalignment typically increases with an increasing size of the monolithic optical plate. It is for the reason of counteracting misalignment that the optical plate is fixedly mounted onto the PCB. However, this has the disadvantage that relatively high mechanical constraints are posed on the PCB and/or optical plate due to the difference in thermal expansion between the PCB and the optical plate in combination with the desired alignment of LEDs and lenses. These high mechanical constraints involve an enhanced and relatively large risk of the formation of cracks in PCB and/or optical plate and hence to early lifetime failure of the LED engine.

SUMMARY OF THE INVENTION

It is an object of the invention to provide an illumination device of the type as described in the opening paragraph in which at least one of the disadvantages is counteracted. Thereto the illumination device according to the invention comprises an optical plate extending over a plurality of LEDs arranged on a PCB main surface of a PCB, in a mounted configuration said PCB and optical plate are mutually connected by a plurality of fasteners,
wherein each fastener extends through a respective, associated through hole in the optical plate in a direction transverse to said PCB main surface,
wherein said associated through hole has a wide portion extending over a depth D from a first main surface of the optical plate facing away from the PCB towards a second main surface of the optical plate facing towards the PCB, which through hole is narrowed to a neck portion at said depth D, and
wherein each fastener extends through said through hole with play S in a plane P parallel to said PCB main surface and rests on a respective, associated resilient washer seated in the wide portion of said associated through hole,
wherein the wide portion comprises a tapered portion which gradually, preferably continually, tapers along depth D, and
wherein the washer is a toothed washer, preferably with teeth extending outward.

The wide portion forms a seat for the resilient washer. The fastener rests with resilient force on the washer, which on its turn is resiliently seated in the wide portion.

The narrowing can be stepwise, for example one step, and/or tapering. Preferably the tapering starts at the first main surface of the optical plate and proceeds, preferably gradually and smoothly, over the depth D. Thus, at said depth D the wide portion is narrowed down to the width of the neck portion. Either the gradually tapering or the stepwise narrowing of the wide portion to the neck portion forms a seat for the resilient washer. The fastener comprises a head and an elongated portion, and rests with its head on the washer while its elongated portion extends through a central opening in the washer and through the optical plate towards the PCB where its grips into the PCB, i.e. the fastener is in fixed position with respect to the PCB, and/or into a heat sink onto which the PCB can be mounted. The washer has a central hole which snugly fits around the elongated portion of the fastener, essentially without play. Furthermore, the washer typically has a shape, for example an outer diameter, which snugly matches with the shape/diameter of the wide portion. Hence, when the optical plate shifts with respect to the fastener, and hence the washer shifts as well, the washer is resiliently deformed, thus urging the optical plate back to its original position. The optical plate can have a local shift with respect to the PCB due to the difference in thermal expansion between the PCB and the optical plate. Yet, locally the optical plate is enabled to have said local shift with respect to the PCB from its original position during warming up of the LED engine because of the play of the fastener within the narrow portion (also referred to as neck portion) of the through hole and the possibility of the washer to shift in the wide portion due to the resiliency of the washer. Said local shift can be different at different locations. Upon cooling down, in case the LED engine is switched off, and the resiliency of the washer causes the optical plate to assume its original position with respect to the PCB.

The washer can have a round perimeter, a polygonal perimeter such as a triangular, a square, a rectangular, a hexagonal or an octagonal shape. The illumination device could be any type of luminaire or illumination device that comprises a PCB with LEDs attached to a (monolithic) optical plate, such as a streetlight luminaire, a tile light luminaire, a ceiling light, an automotive head light luminaire, etcetera. The optical plate can be made of a variety of transparent, light transmissive materials, for example glass, PET: polyethylene terephthalate (PET); poly(methyl methacrylate) (PMMA); polyethylene naphthalate PEN); cyclo olefin copolymer (COC); polycarbonate (PC); high temperature polycarbonate (HTPC); polyetherimide (PEI); polyarylate (PAR); polyphenylene sulfide (PPS); polyethersulfone (PES); polyetheretherketone (PEEK); polyimide (PI); and polyamideimide (PAI).

The illumination device may have the feature that the play S is in each direction in plane P parallel to said PCB main surface. The play can essentially in one direction only, for example as is attained by an elongated slot, but preferably the play is in all directions and hence is embodied as a relatively large hole compared to the diameter of the elongated portion of the fastener that extends through said hole. Thereto, the illumination device may have the feature that the fastener comprises the elongated portion and the head at an end thereof, said elongated portion has a diameter Df in a direction parallel to the main surface, wherein the play S in the neck portion of the through hole and at the elongated portion of the fastener, said play S is in the range of 0.1*Df<=S<=0.3*Df. Of course, the head of the fastener is fitted within the wide portion of the through hole with so much space for movement that it also has at least the same play. The resiliency of the washer is such that it can deform at least with the play of 0.3*Df without being plastically deformed but only deforms elastically.

Just as an example, the linear coefficient of thermal expansion of aluminum at 20° C. is about 23*10-6 K-1 differs significantly from the linear coefficient of thermal expansion of PC and PMMA, respectively being about 70*10-6 K-1 and 77*10-6 K-1. So, the difference in thermal expansion is about 50*10-6 K-1. Hence, for an optical plate of 1 m having a ΔT of about 50° upon warming up, the mutual difference in expansion between optical plate and PCB is about 0.5 mm. For an M4 screw, having a diameter of 4 mm, S is in between 0.4-1.2 mm which matches well with the (maximum) calculated difference of 0.5 mm.

The illumination device may have the feature that the optical plate has a local thickness T at the through hole, and wherein the wide portion is a recess in the first main surface of the optical plate extending over the depth D, wherein 0.25*T<=D<=0.85*T. The minimal depth of the recess is to provide a reliable seat for the washer with to counteract the washer to unintentionally slip out of the seat and to provide sufficient depth for the washer to resiliently bent without protruding from the first main surface of the optical plate. The maximal depth of the recess is to ensure that the optical plate locally has enough strength to withstand the (relatively low) mechanical constraints involved in resiliently deforming of the resilient washer. Typically, the position of a trough hole is not at the location of a (protruding) lens, but rather in a flat area located in between neighboring lenses. The thickness T then relates to the thickness of the optical plate in the flat area. However, if the location of the through hole is at the lens, then the thickness T relates to the thickness of the optical plate at the lens.

The illumination device has the feature that the wide portion comprises a tapered portion which gradually, preferably continually, tapers along its depth D. The tapering preferably extends over the full depth D thus enabling the use of a relatively wide range in size of washers to fit into the gradually tapering through hole. In this case the wide portion may extend over the full thickness of the optical plate, i.e. D=T. Depending on the size of the washer in comparison with the maximum size of the wide portion that changes to the minimum size of the neck portion, the seat position of the washer along the depth of the wide portion varies. Thus, might be coped with a feature of the illumination device of a variation in predetermined distance between the optical plate and the PCB with use of the same size of (a plurality of) fastener. Such a predetermined distance might be determined by the shape of the lens and the desired beam pattern, such as desired beam angle or beam width, or desired mixing of light from neighboring LEDs. Such predetermined distance can easily be obtained by use of spacers. Hence, the illumination device may have the feature that it comprises spacers of a predetermined height positioned in between the optical plate and PCB at the location of the through holes and through which a respective, associated fastener of the plurality of fastener extends.

The illumination device may have the feature that the tapered portion has an average tapering angle α with respect to a normal to the first main surface, wherein 30°<=α<=70°, preferably 40°<=α<=60°. When the tapering is straight, the tapering angle is the same over the full depth. Yet, the tapering can also be curved, for example according to a branch of parabola viewed in cross-section and then the tapering angle varies over the depth, i.e. then the tapering angle typically increases with increasing depth position. This angle range promotes a relatively easy sliding of the washer along the depth of the through hole upon seating and easy control of the degree of bending of the washer, and hence strength, by which the optical plate and PCB are pulled towards each other by the combination of fastener and washer.

The illumination device may have the feature that the washer is made of spring steel or of resilient polymer/plastic. The advantage of steel spring is that it is a convenient and reliable material with a long lifetime for mechanical, resilient parts. The advantage of polymer/plastic material is that it is electrically isolating thus counteracting unintentional electrical contact by users of fasteners that contact the PCB. Alternatively, or additionally, the fasteners can be of plastic/polymer material. Of course, the fasteners can be made of metal as well. Typically, suitable shapes for a fastener comprise a threaded fastener, a bolt, a screw, a snap-click, a split-pen.

The illumination device has the feature that the washer is a toothed washer, preferably with teeth extending outward. Toothed washers are easily designable to provide the desired force of resiliency. This can, for example, be attained by choice of material, thickness of material, length and/or width of teeth, number of teeth and spacing between teeth. Also, the location and orientation of the teeth may affect the provided resiliency of the washer. For example, in that the teeth are extending outwardly from a center of a central ring, i.e. an external tooth washer, or in that the teeth extend inwardly towards a center of an outer ring, i.e. an internal tooth washer. The choice for either one of them can be made as desired, but may depend, for example, on at which location of the washer the resilient deformation of the washer is desired and hence on which part of the illumination device the resilient force is most intensively exerted, i.e. in case of the internal tooth washer close to the center of the washer where the resilient force is exerted most intensively at the fastener, or in case of the external tooth washer at the periphery of the washer where the resilient force is exerted most intensively on the wall of the wide portion of the through hole in the optical plate.

The illumination device may have the feature that the washer is a serrated washer. In the context of the invention a serrated washer has to be understood as a washer that is notched like a saw with teeth of the washer being permanently bent out of a common (or shared) plane, for example in that the teeth are pointing towards the apex. Preferably, the teeth are at an angled position β with the normal to the base ring of the washer (which lies in said common or shared plane), wherein β about has about the same value as the average tapering angle α of the wide portion of the through hole, i.e. β≈α. Yet, preferably β≈α plus a few degrees, for example β≈α+5°. Thus, the washer is/seems a little wider than the tapering wide portion of the through hole for having the washer seated in the through hole in a pretensioned manner when the teeth follow the contour of the wall of the wide portion. Thus, it is ensured that the optical plate and the PCB are permanently urged to assume the mutually aligned (original) position by a permanent, yet relatively low force.

The illumination device may have the feature that the washer comprises n teeth, wherein a convenient number for n appears to be in the range of 3<=n<=24, preferably 4<=n<=12. The illumination device may have the feature that the resilient washer is a star-washer, i.e. the star washer has outwardly extending, tapering teeth, which are shaped in such a manner that these do not abut or overlap each other when they are forced toward each other as a result of a mutual shift of optical plate and PCB in the plane of the PCB main surface and/or by a mutual shift in the direction transverse to said PCB main surface. Such a washer can also be described as a star washer having n points or an n-pointed star washer, the point forming the teeth of the washer. Preferably, the teeth of the star shaped washer each have a rounded tip to enhance a smooth movement of the washer inside the wide portion of the through hole.

The illumination device may have the feature the washer is circularly shaped and has a largest diameter Dw and the teeth have a length L, wherein 0.1*Dw<=L<=0.4*Dw, for example 0.15*Dw<=L<=0.3*Dw, such as 0.2*Dw. It appeared that teeth having lengths within this range provide very well the desired functionality of resiliency and play.

BRIEF DESCRIPTION OF THE DRAWINGS

The invention will now be further elucidated by means of the schematic drawings, which are by no means intended to limit the scope of the invention but rather intended to show its ample possibilities. In the drawings.

DESCRIPTION OF PREFERRED EMBODIMENTS

Figure 1A:
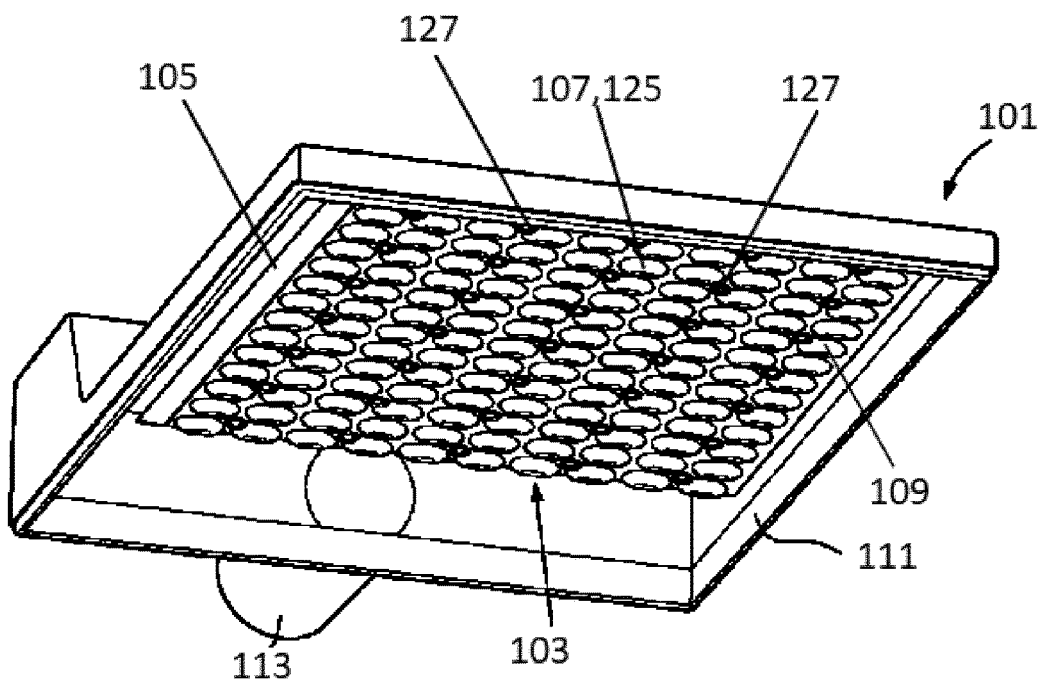
FIG. 1A-B show a perspective view respectively a partial cross section of a luminaire comprising a first embodiment of an illumination device according to the invention.
Figure 1B:
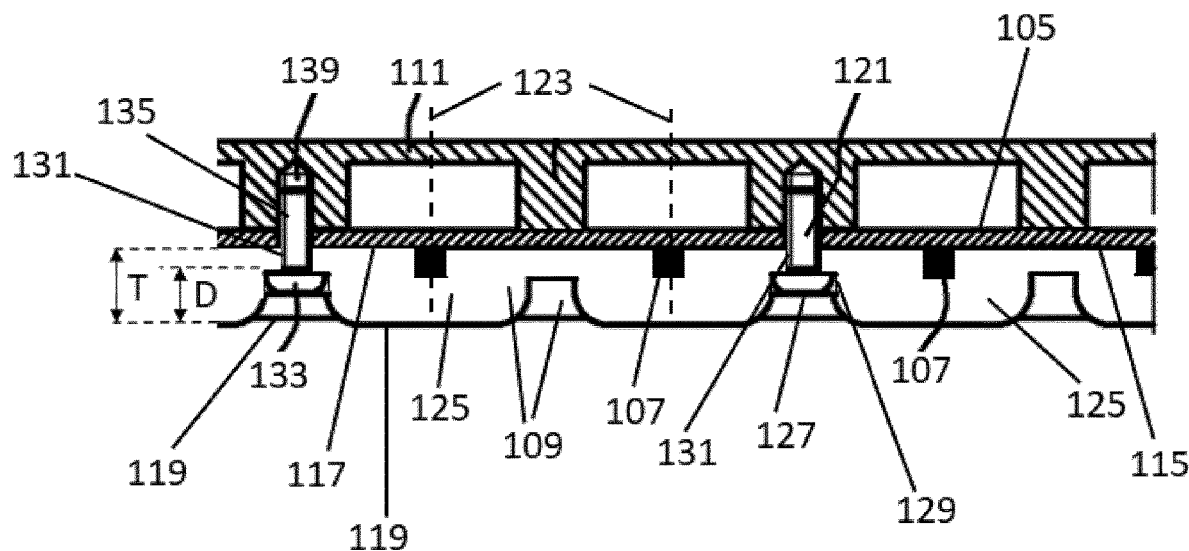

FIG. 1A-B respectively show schematically a perspective view and a partial cross section of a luminaire 101 comprising a first embodiment of an illumination device 103 according to the invention. In the figure the luminaire is a street luminaire, but this alternatively could be any other type of luminaire or illumination device that comprises a PCB 105 with LEDs 107 attached to a (monolithic) optical plate 109, such as a tile light luminaire, ceiling light, automotive head light luminaire. In the figure the street luminaire comprises a housing 111 mounted on a pole 113. In the housing a first embodiment of an illumination device according to the invention is accommodated. The illumination device comprises the optical plate extending over a plurality of LEDs 107 arranged on a PCB main surface 115 of the PCB. The optical plate faces with a first main 117 surface towards the PCB main surface and with a second main surface 119 away from the PCB main surface.

In a mounted configuration said PCB and optical plate are mutually connected by a plurality of fasteners 121 in an aligned position with the LEDs on a respective optical axis 123 of a respective lens 125 of the optical plate. Each fastener extends with play (not shown in FIG. 1A-B, see FIG. 3C) in a plane P parallel to said PCB main surface through a respective, associated through hole 127 in the optical plate in a direction transverse to said PCB main surface. Said associated through hole has a wide portion 129 extending over a depth D from a first main surface of the optical plate facing away from the PCB towards a second main surface of the optical plate facing towards the PCB. In the figure, the wide portion is protruding by a depth D (or has a height D) from said first main surface, wherein D is about 0.7*T, wherein T is the thickness of the optical plate. Said through hole is narrowed to a neck portion 131 at said depth D. Each fastener rests with its head 133 on a respective, associated resilient washer (not shown) seated in the wide portion of said associated through hole. Each fastener extends with its elongated portion 135 through the neck portion 131 of a respective through hole and is screwed with at least a part of a threaded portion 139 of the fastener onto the housing.

Figure 2:
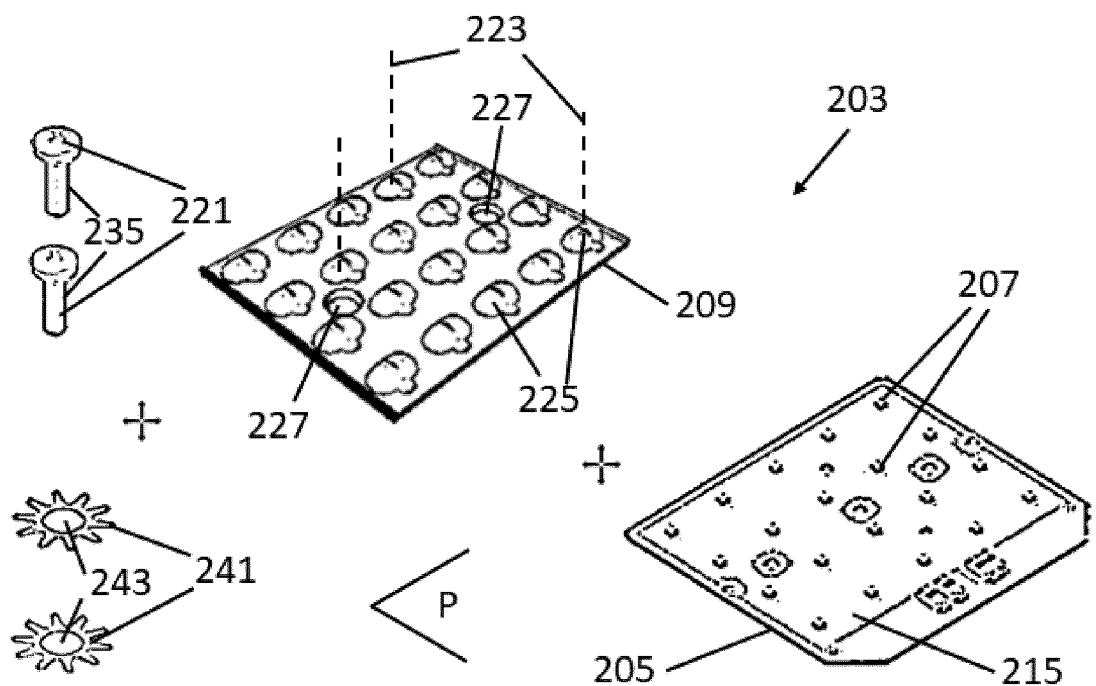
FIG. 2 shows the components of concept of a second embodiment of an illumination device according to the invention.

FIG. 2 schematically shows separate components of a second embodiment of an illumination device 203 according to the invention before assembly of the illumination device. The components of said second embodiment comprise two M4 bolts as fasteners 221, two resilient 10-pointed (is 10-toothed) star-shaped washers 241, one optical plate 209 made of PMMA (but said optical plate alternatively could be made of, for example, PC) and a PCB 205 with electronic components like LEDs 207, resistors, sensors, conductive patterns layout, etcetera. In this embodiment the optical plate comprises only two through holes 227, but of course, the number of through-holes in an optical plate and the number of fasteners can be more than two and depends on the size of the (monolithic) optical plate, the larger the size, the more through holes and the more fasteners.

Assembling could, for example, be done as follows: the optical plate is placed in an aligned position on the PCB, with the LEDs on the PCB being positioned on a respective optical axis 223 of an associated lens 225 of the optical plate. Subsequently the washers are inserted into a respective through hole in the optical plate. Finally, the bolts are inserted in the through hole with an elongated portion 235 thereof extending through an opening 243 in the respective washer and through the respective through-hole, and screwed into respective threaded recesses in the PCB, thereby pulling the optical plate and the PCB toward each other, and fixing the optical plate onto the PCB with play (not shown) in each direction in a plane P parallel to the PCB main surface 215.

Figures 3A, 3B:
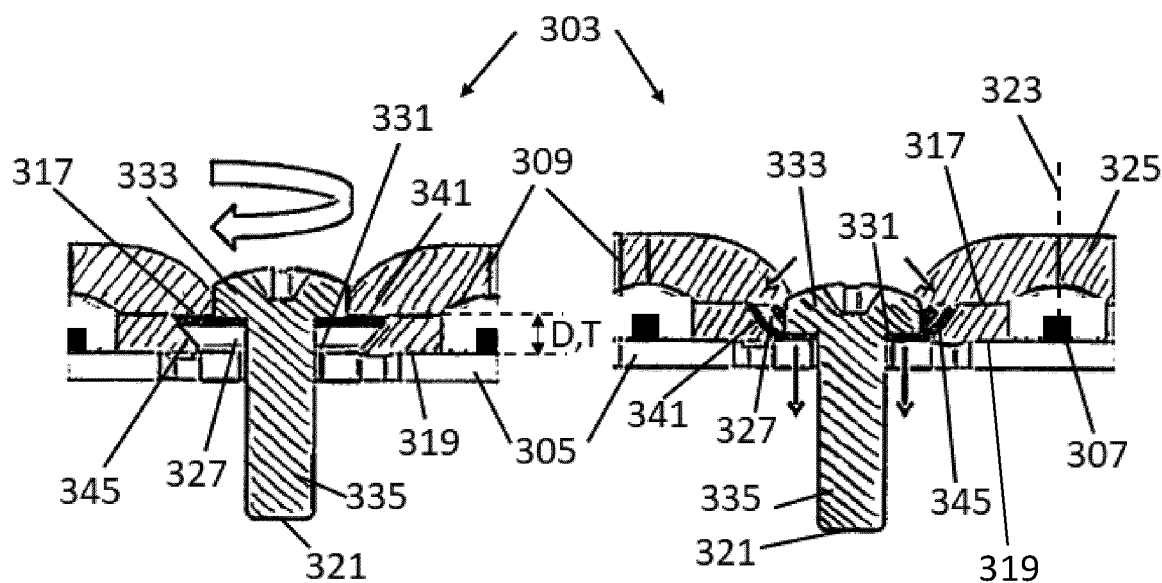
FIG. 3A-D show final stages in assembling embodiments of an illumination device according to the invention and details about resilient deformation and play.

FIG. 3A-D show partial cross-sectional views of final stages in assembling an embodiment of an illumination device 303 according to the invention and details about resilient deformation and play. FIG. 3A shows the combination of the optical plate 309 and the PCB 305 in aligned position, i.e. LEDs 307 are on the optical axes 323 of lenses 325. A washer 341 is seated in a through hole 327 of the optical plate and a fastener 321 is resting with its head 333 on the washer and extends with an elongated portion 335 of the fastener through the washer, the through hole and the PCB to a connectable heat sink (not shown) and/or housing (not shown). The through hole in the optical plate has a wide portion 329 which is gradually tapering from a first main surface 317 of the optical plate towards a second main surface 319 of the optical plate. The through hole has a depth D in the optical plate which is the same as the thickness T of the optical plate and tapers to an opening in the second main surface with smallest diameter of the through hole. Said smallest opening in the second main surface being the neck portion 331.

In FIG. 3A it is shown that the washer is seated as a flat washer in the through hole and does not (yet) exert a (permanent) force on the optical plate and PCB. Upon screwing/tightening the fastener, the washer undergoes a resilient deformation and seats in the through hole assuming the gradually tapering shape of the through hole and because of said resilient deformation exerts a permanent force on the optical plate and PCB by which the optical plate and PCB are pulled towards each other, as shown in FIG. 3B. The gradually tapering hole has a wall 345 shaped a rotational body of revolution of a branch of a parabola around an axis of said parabola (shown in more detail in FIG. 3C). Said branch being at an average angle α is in an angled position with respect to a normal to the first main surface, wherein α is about 40°.

Figure 3C:
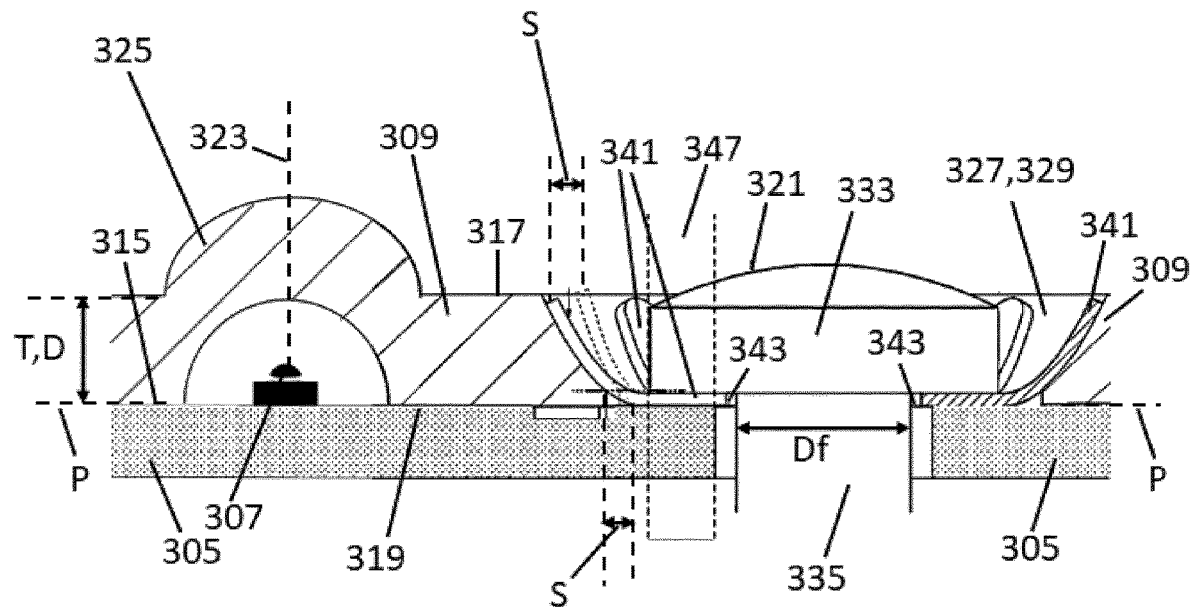

FIG. 3C is an enlarged, detailed cross-sectional view of FIG. 3B and shows an assembled configuration of the optical plate 309, the PCB 305, the washer 341 and the fastener 321 and where the play S in a plane P parallel to said PCB main surface 315 is determined/measured. FIG. 3C further shows a LED 307 mounted on the PCB and being aligned with an optical axis 323 of an associated lens 325 of the optical plate. The washer 341 has a central opening 343 sufficiently larger than a diameter Df of an elongated portion 335 of the fastener (for example 15% larger) rendering the washer to easily fit around an elongated portion 335 of the fastener 321. The washer is seated in the through hole 327 of the optical plate and the fastener is resting with its head 333 on the washer and extends with an elongated portion 335 through the washer, the through hole and is firmly fixed to the PCB. The fastener is screwed into the PCB in such a tight manner as to clamp the washer between the head of the fastener and the PCB, thus forcing it to stay in position with respect to the PCB. On one side of the fastener the clamping zone 347 is indicated as a grey vertical column in the figure (though it is present as a circumferential zone around the fastener). The resiliency of the washer enables movement of the optical plate in the direction parallel to plane P with respect to the PCB (and the washer and fastener). The through hole in the optical plate has a wide portion 329 which is gradually tapering from a first main surface 317 of the optical plate towards a second main surface 319 of the optical plate. The through hole has a depth D in the optical plate which is the same as the thickness T of the optical plate and tapers to a neck portion 331 of the through hole. The fastener has a play S, in the figure about 0.15*Df on either side, in the neck portion of the through hole. The washer has a resiliency S of at least the same magnitude (indicated in ghost lines in the figure).

Figure 3D:
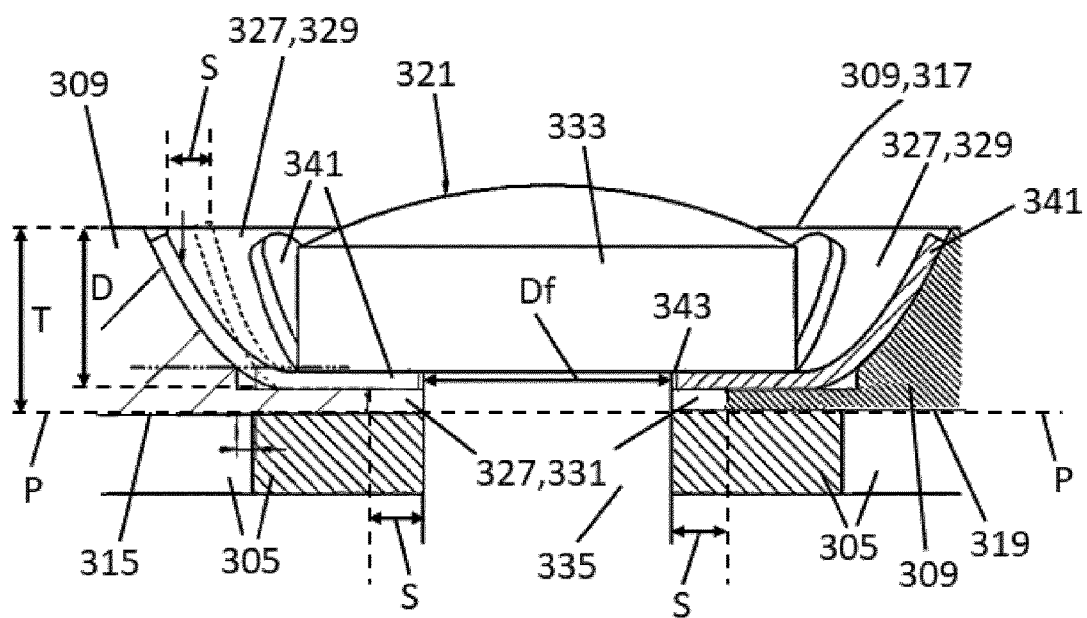

FIG. 3D is an enlarged, detailed local cross-sectional view of another embodiment of the illumination device and shows an assembled configuration of the optical plate 309, the PCB 305, the washer 341 and the fastener 321 and where the play S in a plane P parallel to said PCB main surface 315 is determined/measured. The washer 341 has a central opening 343 being about minimally larger than a diameter Df (for example by 1%) rendering the washer to snugly fit, i.e. with essentially no play, around an elongated portion 335 (having said diameter Df) of the fastener 321. The washer is seated in the through hole 327 of the optical plate and the fastener is resting with its head 333 on the washer and extends with an elongated portion 335 through the washer, the through hole and is firmly fixed to the PCB. The fastener is screwed into the PCB in sufficiently tight manner to counteract movement of optical plate and washer in the direction perpendicular to plane P, but not too tight in order to avoid clamping of washer and the optical plate between the head of the fastener and the PCB, thus to enable movement of the optical plate in the direction parallel to plane P. The through hole in the optical plate has a wide portion 329 which is gradually tapering from a first main surface 317 of the optical plate towards a second main surface 319 of the optical plate. The through hole has a depth D in the optical plate which is about 85% of the thickness T of the optical plate and tapers to a neck portion 331 of the through hole. The fastener has a play S, in the figure about 0.25*Df on either side, in the neck portion of the through hole. The washer has a resiliency S of the same magnitude (indicated in ghost lines in the figure).

Figure 4A:
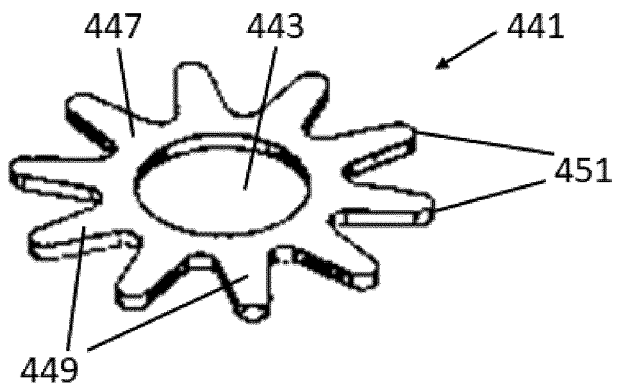
FIG. 4A-F show various types of suitable washers for illumination devices according to the invention.

FIG. 4A-F show various types of suitable washers for illumination devices according to the invention. FIG. 4A shows a perspective view of a flat, star-shaped, resilient washer 441. The washer comprises a central ring 447 having a central opening 443, with a plurality of teeth 449 (or points) extending radially outwards from the central ring and wherein each tooth comprises a rounded tip 451. In the figure, the plurality of teeth comprises ten teeth, but this plurality could be any number from three to hundred, for example four, six, eight, twelve, twenty. This equally applies to all washers having a plurality of teeth.

Figure 4B:
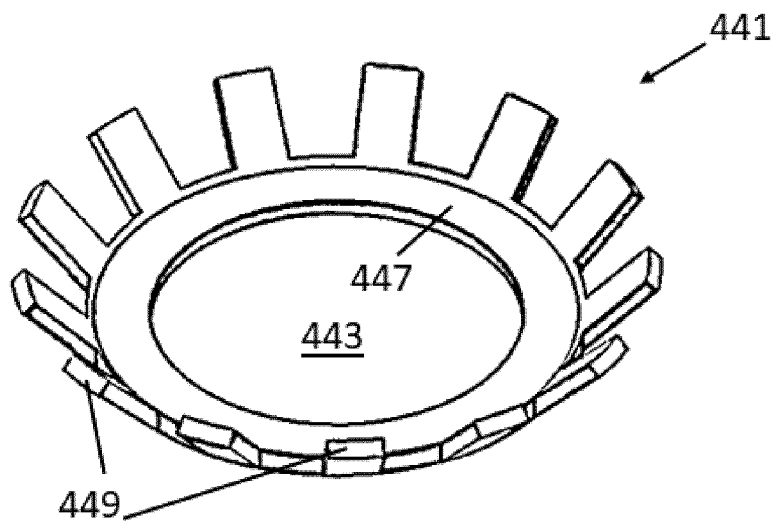
Figure 4C:
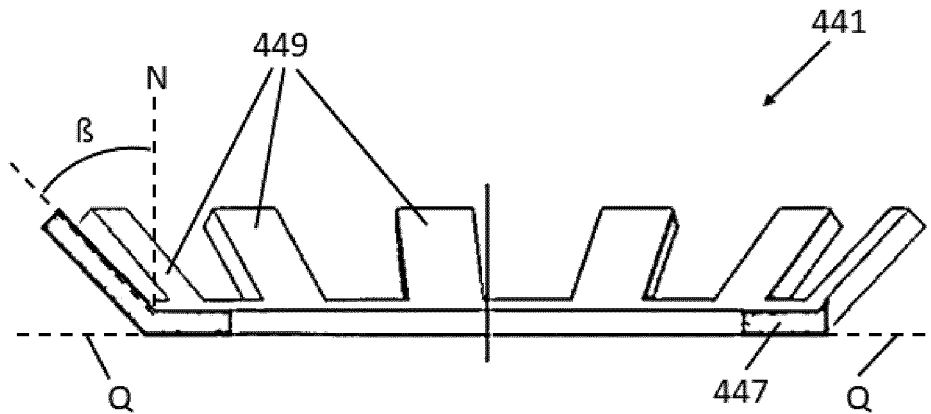

FIGS. 4B and 4C respectively show a perspective view and a cross-sectional view of a serrated, star-shaped, resilient washer 441. The washer comprises a central ring 447 having a central opening 443, with a plurality of teeth 449 extending outwards from the central ring and out of plane Q as defined by the central ring. The serrated washer can be described as a washer that is notched like a saw with teeth which are being permanently bent out of a plane formed by the central ring, for example in that the teeth are pointing towards the apex. Preferably, the teeth are at an angled position β with a normal N to the base ring of the washer (which lies in said common or shared plane), in the figure β is about 45°, but β preferably is in the range of 30°<=β<=60° and slightly larger than α (see FIG. 3C).

Figure 4D:
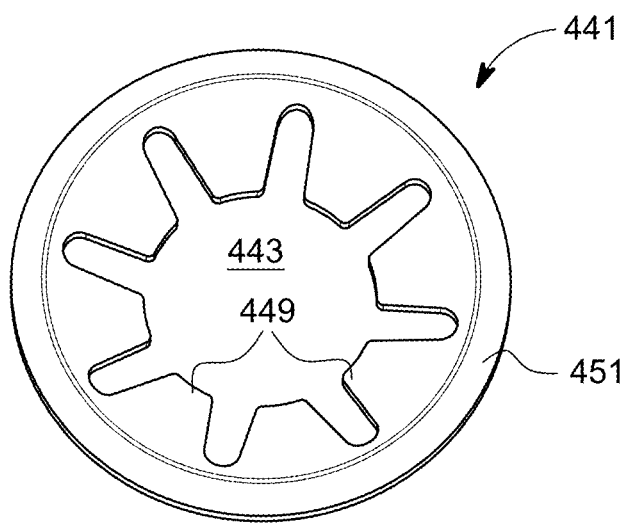
Figure 4E:
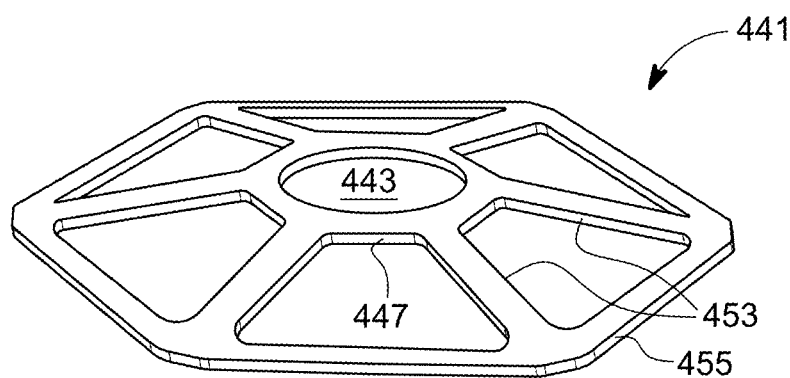
Figure 4F:
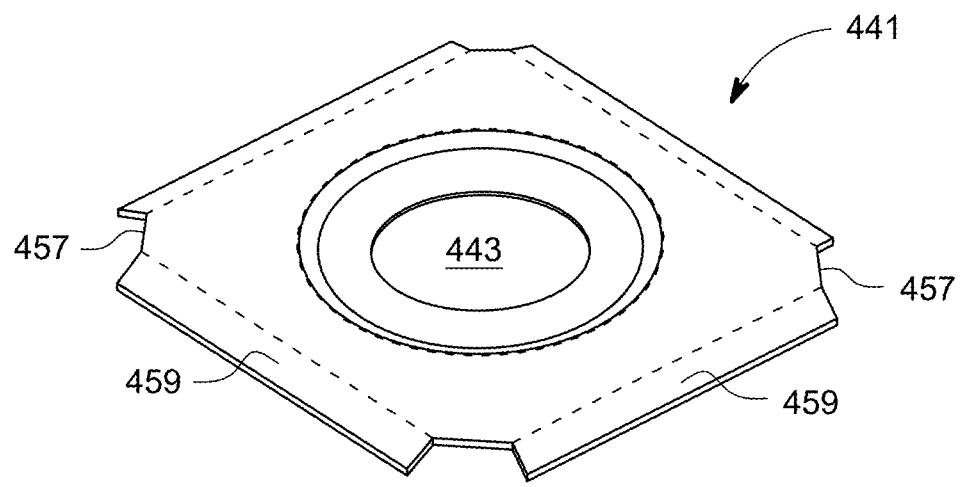

FIGS. 4D, 4E and 4F show various types of serrated, non-star-shaped, resilient washers 441. The washer 441 shown in FIG. 4D comprises an outer ring 451 having a central opening 443, with a plurality of teeth 449, eight in the figure, extending inwards from the outer ring to the central opening. The teeth extend at an angle of about 15° out of the plane, i.e. β is about 75° (not indicated), as defined by the outer ring. The washer 441 shown in FIG. 4E comprises an inner ring 447 having a central opening 443, with a plurality of spokes 453, six in the figure, extending outwards from the inner ring to an outer hexagonal shaped ring 455. The spokes extend at an angle of about 12° out of the plane, i.e. β is about 78° (not indicated), as defined by the outer ring. The washer 441 shown in FIG. 4F is essentially a square shaped, serrated, resilient washer comprising a central opening 443. Said washer has four indents 457 at the corners of the square shaped washer with bent edge areas 459 of the washer. The bent edge areas are oriented at an angle of about 45° with the plane as defined by the central opening.

The invention claimed is:
1. An illumination device comprising an optical plate extending over a plurality of LEDs arranged on a PCB main surface of a PCB, in a mounted configuration said PCB and optical plate are mutually connected by a plurality of fasteners, wherein each fastener extends through a respective, associated through hole in the optical plate in a direction transverse to said PCB main surface, wherein said associated through hole has a wide portion extending over a depth D from a first main surface of the optical plate facing away from the PCB towards a second main surface of the optical plate facing towards the PCB, which through hole is narrowed to a neck portion at said depth D, and wherein each fastener extends through said through hole with play S in a plane P parallel to said PCB main surface and rests on a respective, associated resilient washer seated in the wide portion of said associated through hole, wherein the wide portion comprises a tapered portion which gradually, preferably continually, tapers along depth D, and wherein the washer is a toothed washer, preferably with teeth extending outward.

2. An illumination device as claimed in claim 1, wherein the play S is in each direction in the plane P parallel to said PCB main surface.

3. An illumination device as claimed in claim 1, wherein the optical plate has a local thickness T at the through hole, and wherein the wide portion is a recess in the first main surface of the optical plate extending over the depth D, wherein $0.25*T<=D<=0.85*T$.

4. An illumination device as claimed in claim 1, wherein the fastener comprises an elongated portion and a head at an end thereof, said elongated portion has a diameter Df in a direction parallel to the main surface, wherein the play S in the neck portion is in the range of $0.1*Df<=S<=0.3*Df$.

5. An illumination device as claimed in claim 1, wherein teeth are at an angled position β with the normal to the base ring of the wherein β and the wide portion of the through hole has an average tapering angle α, wherein $α<=β<=α+5°$.

6. An illumination device as claimed in claim 1, wherein the tapered portion has an average tapering angle α with respect to a normal to the first main surface, wherein $30°<=α<=70°$.

7. All illumination device as claimed in claim 1, wherein the washer is made of spring steel or of resilient polymer/plastic.

8. An illumination device as claimed in claim 1, wherein the fastener is selected from the group consisting of a threaded fastener, a bolt, a screw, a snap-click, a split-pen.

9. An illumination device as claimed in claim 1, wherein the optical plate and the PCB are maintained at a predetermined distance by the plurality of fasteners.

10. An illumination device as claimed in claim 1, comprising spacers of a predetermined height positioned in between the optical plate and PCB at the location of the through holes and through which a respective, associated fastener of the plurality of fastener extends.

11. An illumination device as claimed in claim 1, wherein the washer is a serrated washer.

12. An illumination device as claimed in claim 1, wherein the washer comprises n teeth, wherein $3<=n<=24$.

13. An illumination device as claimed in claim 1, wherein the resilient washer is a star-shaped washer.

14. An illumination device as claimed in claim 1, wherein the washer is circularly shaped and has a largest diameter Dw and the teeth have a length L, wherein $0.1*Dw<=L<=0.4*Dw$.

15. An illumination device as claimed in claim 1, wherein the tapered portion has an average tapering angle α with respect to a normal to the first main surface, wherein $40°<=α<=60°$.

16. An illumination device as claimed in claim 1, wherein the washer comprises n teeth, wherein $4<=n<=12$.

* * * * *